(12) United States Patent
Shibuya

(10) Patent No.: US 7,054,666 B2
(45) Date of Patent: May 30, 2006

(54) METHOD OF CALLING FUNCTION BY KEYWORD DETECTION IN PORTABLE COMMUNICATION APPARATUS

(75) Inventor: Atsushi Shibuya, Tokyo (JP)

(73) Assignee: NEC Corporation, Tokyo (JP)

( * ) Notice: Subject to any disclaimer, the term of this patent is extended or adjusted under 35 U.S.C. 154(b) by 829 days.

(21) Appl. No.: 09/851,303

(22) Filed: May 8, 2001

(65) Prior Publication Data

US 2001/0044326 A1    Nov. 22, 2001

(30) Foreign Application Priority Data

May 16, 2000    (JP) ............................. 2000-143245

(51) Int. Cl.
H04B 1/38    (2006.01)
(52) U.S. Cl. .................... 455/566; 455/567; 455/575.4
(58) Field of Classification Search ................ 455/566, 455/550.1, 567, 575.4, 575.6; 340/825.18, 340/825.31; 909/207, 206; 709/530, 700, 709/207
See application file for complete search history.

(56) References Cited

U.S. PATENT DOCUMENTS

| | | | |
|---|---|---|---|
| 6,259,934 B1 | 7/2001 | Guerlin | |
| 6,269,260 B1 * | 7/2001 | Shin et al. | 455/550.1 |
| 6,285,891 B1 * | 9/2001 | Hoshino | 455/567 |
| 6,304,763 B1 * | 10/2001 | Jahagirdar et al. | 455/566 |
| 6,445,932 B1 * | 9/2002 | Soini et al. | 455/566 |
| 6,640,113 B1 * | 10/2003 | Shim et al. | 455/566 |

FOREIGN PATENT DOCUMENTS

| | | |
|---|---|---|
| EP | 0964594 A1 | 12/1999 |
| JP | 94/18760 | 8/1994 |
| JP | 08-28343 | 11/1996 |
| JP | 8-294155 | 11/1996 |
| JP | 10-155038 | 6/1998 |
| JP | 10-174137 | 6/1998 |
| JP | 11-55449 | 2/1999 |
| JP | 11-215530 | 8/1999 |
| JP | 2001084203 A | 9/1999 |
| JP | 11-289570 | 10/1999 |
| JP | 11-298656 | 10/1999 |
| JP | 11-331411 | 11/1999 |
| JP | 2001236351 A | 2/2000 |
| WO | WO 00/03551 A2 | 7/1998 |

OTHER PUBLICATIONS

Copy of English translation of the People's Republic of China Office Action dated Jun. 20, 2003.

* cited by examiner

*Primary Examiner*—Lana Le
(74) *Attorney, Agent, or Firm*—Dickstein, Shapiro, Morin & Oshinsky, LLP (57) ABSTRACT

A portable communication terminal apparatus including a function provided for the portable communication terminal apparatus is registered in association with a predetermined word (keyword). When the registered keyword is extracted from character data displayed on the display screen of the portable communication terminal apparatus, the function registered in the portable communication terminal apparatus in association with the extracted keyword is called and executed.

8 Claims, 11 Drawing Sheets

| KEYWORD | FUNCTION | OPERATION |
|---------|----------|-----------|
| LIGHT | LED | BLINKING PATTERN 1 |
| WEDDING | MELODY PLAYBACK | WEDDING MARCH |
| CLAP-CLAP | SOUND EFFECT | IMITATION SOUND |
| VIBRATION | VIBRATION | VIBRATION PATTERN 5 |
| THUNDER | BACKLIGHT | BLINKING PATTERN 1 |
| • | • | • |
| • | • | • |
| • | • | • |
| • | • | • |

IT IS CLEAR WITH OCCASIONAL THUNDER TODAY.

IT WILL BE VERY FINE TOMORROW.

(BLINDING OF BACKLIGHT)

PLEASE REGISTER
FOLLOWING IN
TELEPHONE DIRECTORY

REGISTRATION TANAKA
09012345678

THANK YOU

FIG.9

| KEYWORD (T1) | FUNCTION (T2) | FIRST PARAMETER (T4) | SECOND PARAMETER (T5) |
|---|---|---|---|
| REGISTRATION | TELEPHONE DIRECTORY | NAME | TELEPHONE NUMBER |
| MAIL | MAIL EDITING | ADDRESS | |
| • | • | • | • |
| • | • | • | • |
| • | • | • | • |
| • | • | • | • |
| • | • | • | • |
| • | • | • | • |
| • | • | • | • |

| KEYWORD | FUNCTION | OPERATION |
|---------|----------|-----------|
| CLEAR | REPLACEMENT |  |
| RAIN | REPLACEMENT |  |
| THUNDER | REPLACEMENT |  |
| CLOUDY | REPLACEMENT |  |

METHOD OF CALLING FUNCTION BY KEYWORD DETECTION IN PORTABLE COMMUNICATION APPARATUS

BACKGROUND OF THE INVENTION

1. Field of the Invention

The present invention relates to a portable communication terminal apparatus such as a cellular phone and, more particularly, to a method of calling functions provided for a portable communication terminal apparatus.

2. Description of the Prior Art

Recently, cellular phones have been used to perform data communication using characters. Character data such as received electronic mail is stored in a built-in storage section, and the user of the character data reads out the data from the storage section to display it on the display section of the cellular phone, thereby checking the mail contents. When the user wants to transmit mail through the cellular phone, he/she inputs characters with the ten-key pad and displays them on the display section to check the contents. After character input operation, the user transmits the mail.

The user can register telephone numbers and the like in the storage section in the cellular phone. When the user is to register a telephone number or the like, he/she inputs characters and the like by operating the ten-key pad provided on the operating section, thereby registering the telephone number of the like.

As described above, in a cellular phone with small input interface facilities, since data is registered in the memory in the cellular phone by inputting characters with the 10-key pad, many operations are required, resulting in cumbersome registering operation. In performing data communication through a cellular phone, when received character data is to be registered, the data must be printed on a paper sheet and input in the cellular phone again.

Although the cellular phone has been described as a portable communication terminal apparatus, the same applies to other portable terminal apparatuses.

Data may be registered in the memory of a terminal apparatus with a simple character string alone. In many cases, however, a special language (HTML: Hyper Text Markup Language) or the like must be used, and hence an easy registration is difficult to realize.

In addition, since HTML or the like cannot be used on general electronic mail, it is required to register in the memory by using only general characters.

For a similar reason, a portable communication terminal apparatus such as a cellular phone cannot receive mail to which a melody or voice is attached, and hence cannot perform multimedia operation.

SUMMARY OF THE INVENTION

The present invention has been made in consideration of the above situation in the prior art, and has as its first object to provide a method of easily registering character data and functions in a memory of a self-apparatus and easily calling the registered character data and functions.

It is the second object of the present invention to provide a portable communication terminal apparatus which can receive mail to which a melody, voice, or the like is attached.

In order to achieve the first object, according to the first principal aspect of the present invention, there is provided a method of calling a function by keyword detection in a portable communication terminal apparatus, comprising the steps of registering a function provided for the portable communication terminal apparatus in association with a predetermined word (keyword), and when the registered keyword is extracted from character data displayed on a display screen of the portable communication terminal apparatus, calling and executing the function registered in the portable communication terminal apparatus in association with the extracted keyword.

The following secondary aspects can be added to the first principal aspect.

The extracted keyword is inverted/displayed.

The function provided for the portable communication terminal apparatus comprises a function selected from a melody playback function, sound effect function, voice function, display light blinking function, backlight blinking function, and vibration motor control function or a combination thereof.

The function provided for the portable communication terminal apparatus comprises a function of registering display character data following the extracted keyword in a built-in memory.

The function provided for the portable communication terminal apparatus comprises a function of replacing the extracted keyword with another character or an illustration.

In order to achieve the second object, according to the second principal aspect of the present invention, there is provided a portable communication terminal apparatus comprising a CPU for controlling a function provided for the portable communication terminal apparatus, a storage section including a ROM used as an area in which a program for operating the CPU is stored and a RAM used as an area for temporarily storing data during operation of the CPU and retaining data registered by a user, a display section used to display a character and graphic pattern under the control of the CPU, a ten-key pad operating section for allowing the user to perform key input operation, and a button control section used to transfer data key-input by the user to the CPU, wherein a keyword table in which the function associated with a predetermined word (keyword) and an operation of executing the function are registered is stored in the RAM of the storage section, and the CPU comprises means for looking up the keyword table, means for extracting the keyword from character data displayed on the display section and displaying the keyword in a recognizable form, and means for calling the function associated with the extracted keyword and controlling execution of the function when a function execution instruction is received from the button control section.

The following secondary aspects can be added to the second principal aspect.

The keyword table stored in the RAM is configured such that a registered content can be changed or a content can be added.

The apparatus can further comprise means for inverting/displaying the extracted keyword as means for displaying a keyword in a recognizable form.

The portable communication terminal apparatus comprises an output section used to output an audio signal, a backlight used to illuminate the display section, a display light ON/OFF-controlled by the CPU, and a vibration motor which is ON/OFF-controlled by the CPU to generate vibrations to be felt by a user, and the CPU comprises means for controlling one operation selected from melody playback, sound-effect operation, voice outputting operation by the sound output section, blinking of the display light, blinking of the backlight, control of the vibration motor or a combination thereof.

The CPU comprises a function of registering displayed character data following the extracted keyword in a built-in memory upon reception of a function execution instruction from the button control section.

The CPU comprises a function of replacing the extracted keyword with another character or an illustration and displaying the character or illustration upon reception of a function execution instruction from the button control section.

The CPU comprises a function of replacing the character or illustration with the original keyword and displaying the keyword upon reception of a function execution instruction from the button control section.

The apparatus can further comprise means for transmitting the keyword table stored in the storage section, and means for storing the keyword in the storage section.

As is obvious from the above aspects, according to the present invention, by detecting a keyword in mail text displayed on the display section, the corresponding function provided for the portable communication terminal apparatus can be easily called. This makes it possible to transmit/receive mail to which a melody or voice is attached through a portable communication terminal apparatus such as a cellular phone, thus allowing the portable communication terminal apparatus to perform multimedia operation.

In addition, according to the present invention, a function provided for a portable communication terminal apparatus can be called and executed in accordance with a general character string alone. The operation of the portable communication terminal apparatus can therefore be controlled without describing programs in a complicated programming language.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

Several preferred embodiments of the present invention will be described below with reference to the accompanying drawings.

Figure 1:
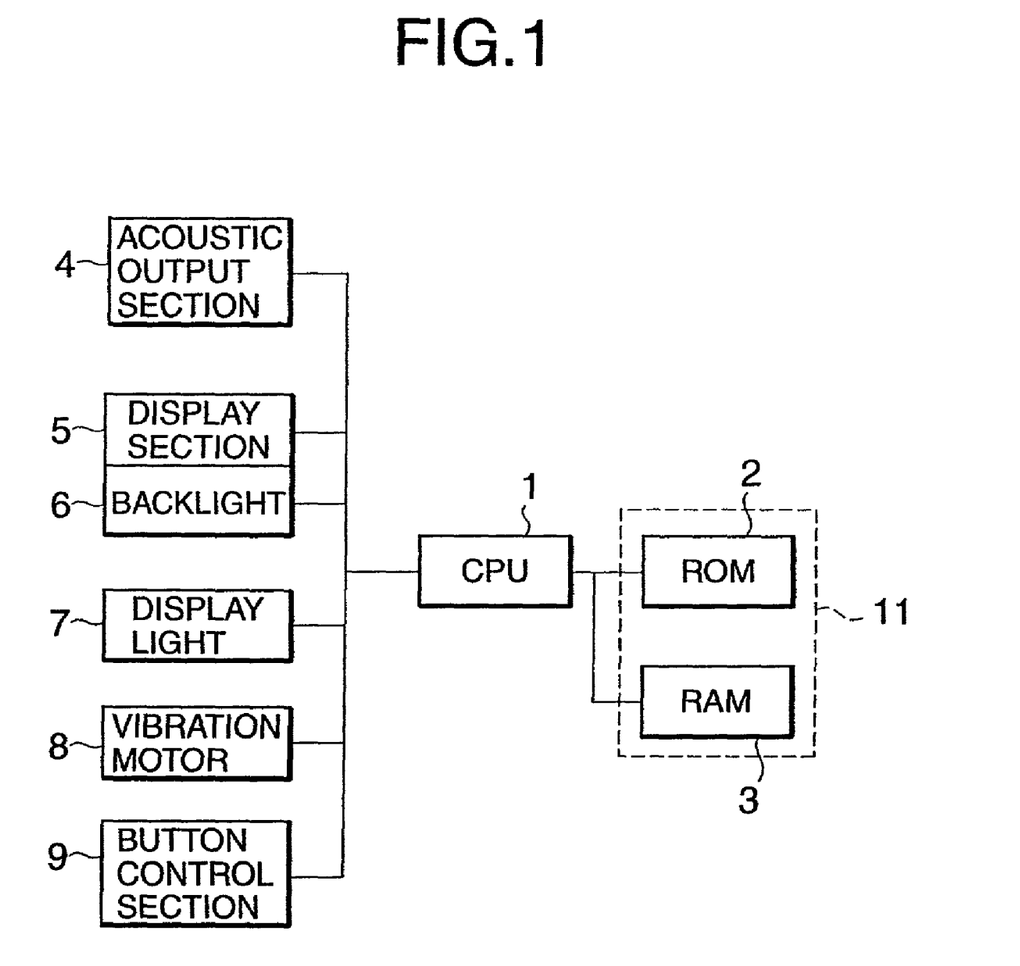
FIG. 1 is a block diagram of a portion for operating functions provided for a portable communication terminal apparatus to which the present invention is applied.

FIG. 1 is a block diagram showing a portion for performing functions provided for a portable communication terminal to which the present invention is applied. Referring to FIG. 1, a CPU 1 is a microcomputer for controlling the terminal apparatus. A ROM 2 in a storage section 11 is used as an area in which programs for operating the CPU 1 are stored. A RAM 3 is used as an area for temporarily storing data during operation of the CPU 1 and an area for storing data that can be registered by a user.

An acoustic output section 4 is used to output a voice signal or a melody signal or sound effect signal and comprised of an audio signal amplifying element, speaker, and the like. A display section 5 is used to display characters and graphic patterns under the control of the CPU 1, and is comprised of a liquid crystal display (LCD) and the like. A backlight 6 is used to illuminate the display section 5.

A display light 7 is a light-emitting element ON/OFF-controlled by the CPU 1, and is mainly formed by an element such as an LED. A vibration motor 8 is ON/OFF-controlled by the CPU 1 and is used to make the user feel operation by vibrations. A button control section 9 is used to transfer the key input by the user to the CPU 1.

Figure 2:
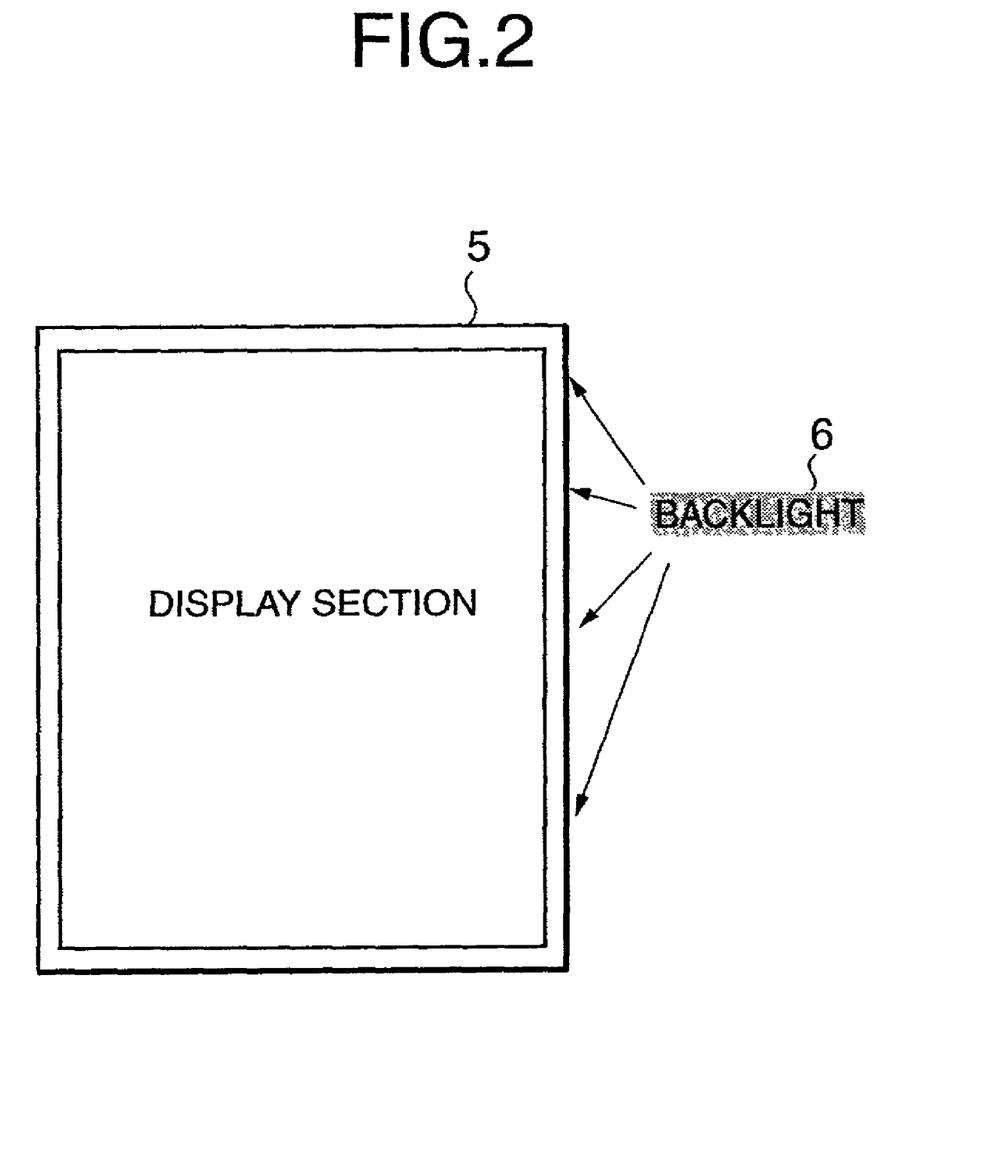
FIG. 2 is a front view showing the schematic arrangement of a display section.

FIG. 2 is a view showing the arrangements of the display section 5 and backlight 6. The backlight 6 using an element such as an LED or fluorescent tube (cathode tube) is placed below or above the display section 5. The backlight 6 is used to allow the user to clearly see characters and graphic patterns on the display section 5.

Figure 3:
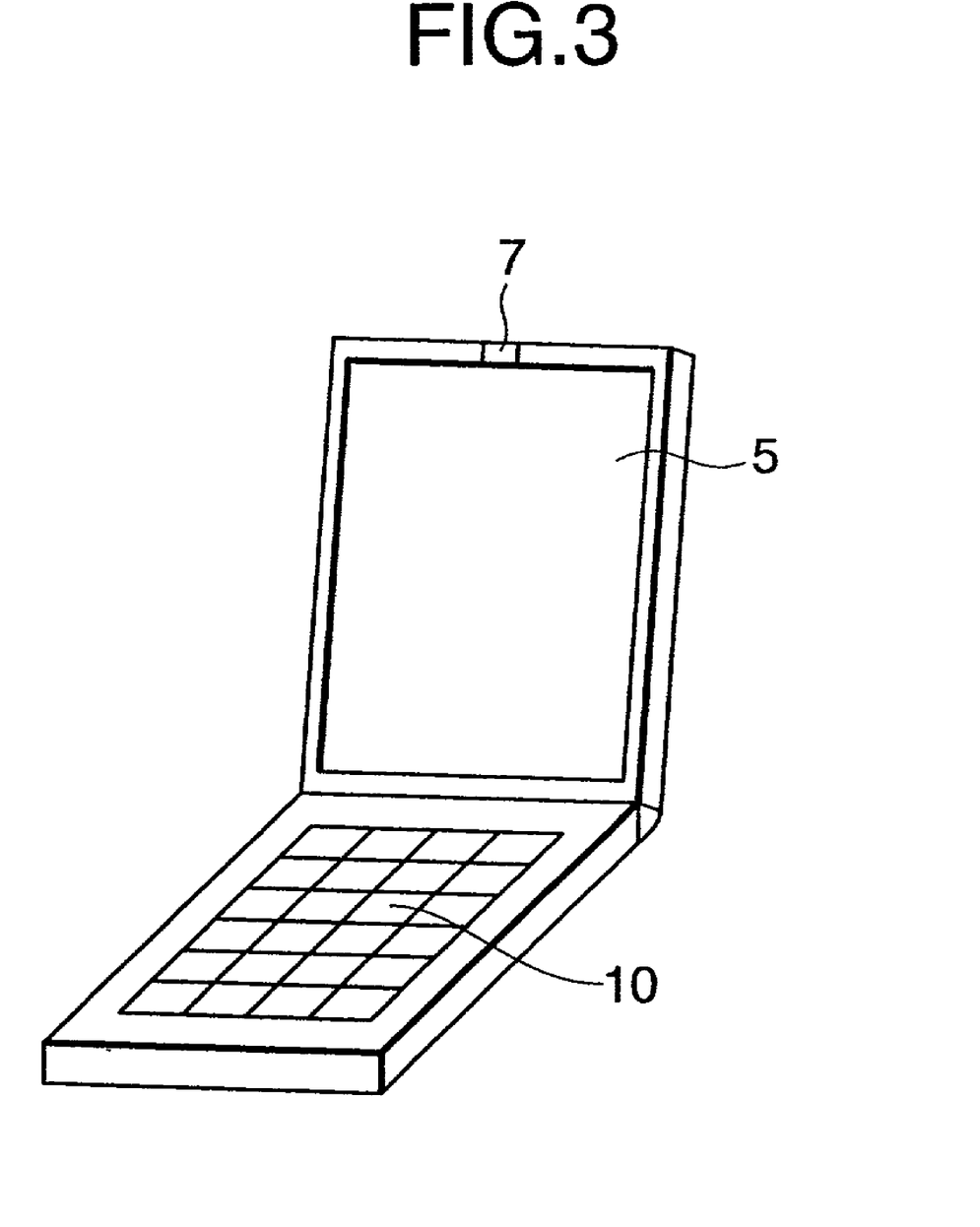
FIG. 3 is a perspective view showing the schematic arrangement of a portable communication terminal apparatus according to the present invention.

FIG. 3 is a perspective view showing the arrangement of a portable terminal apparatus using the arrangements shown in FIGS. 1 and 2. The display section 5, the display light 7, and a ten-key pad section 10 are arranged on the operation surface side, and the vibration motor 8 is placed inside the apparatus.

The operations of several preferred embodiments of a method of calling functions by keyword detection according to the present invention will be described next.

When the apparatus shown in FIG. 3 receives character data such as electronic mail, the mail is stored in the RAM 3. When the user operates the ten-key pad section 10, the mail is displayed as character data on the display section 5. At this time, the CPU 1 executes a keyword search with respect to the characters displayed on the display section 5. Keywords are stored in a keyword table retained in the ROM 2 or RAM 3.

Figure 4:
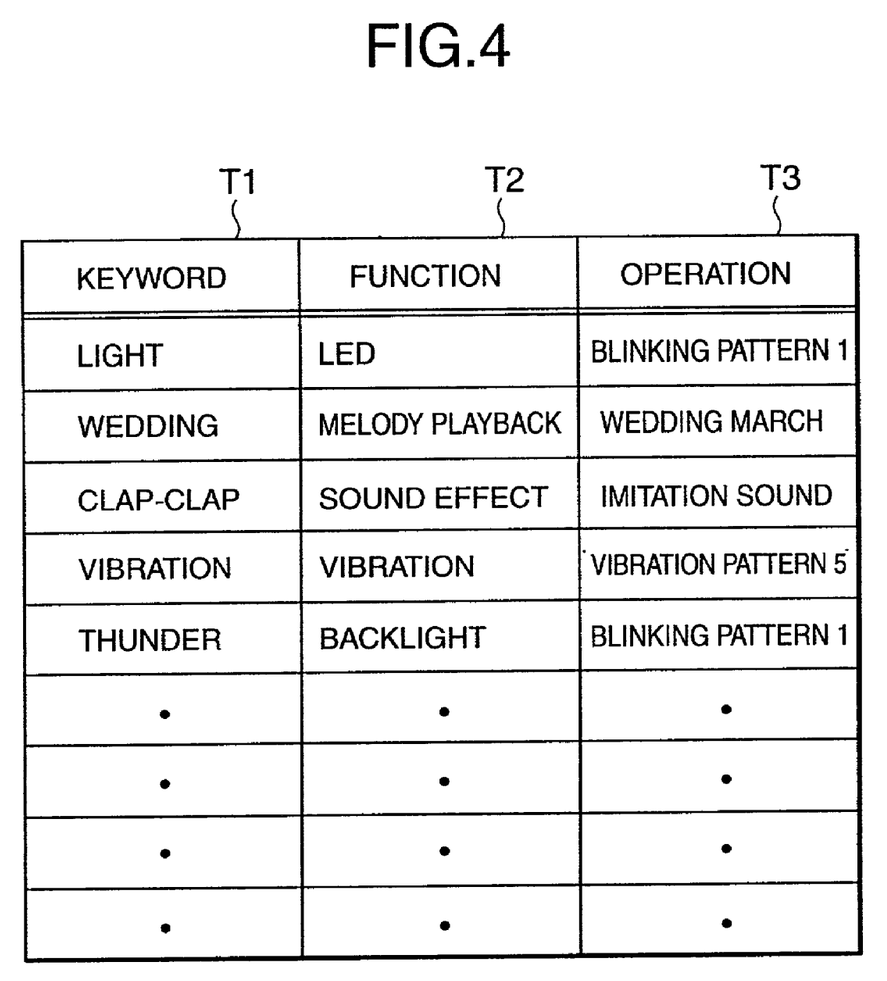
FIG. 4 is a view showing a keyword table to explain the first embodiment of a method of the present invention.
Figure 5:
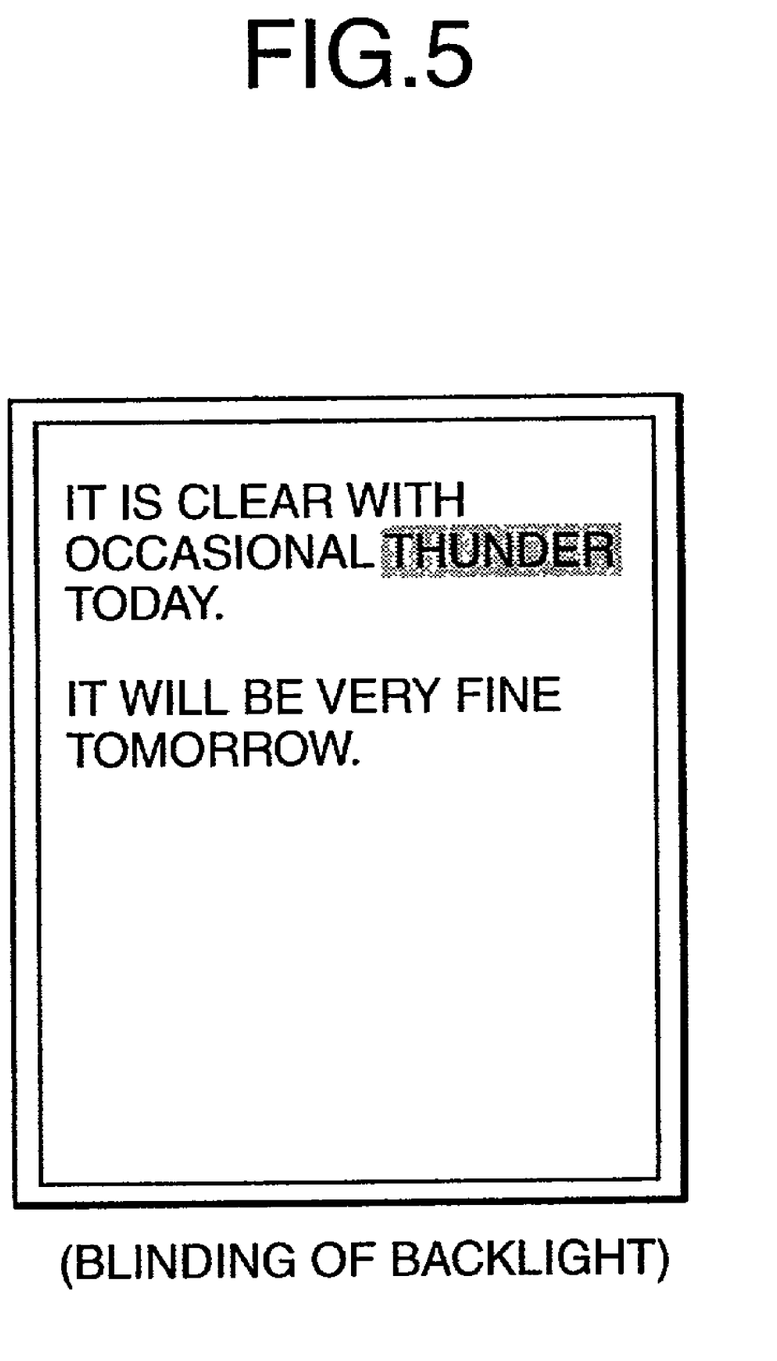
FIG. 5 is a view showing a display operation sample according to the first embodiment of the method of the present invention.
Figure 6:
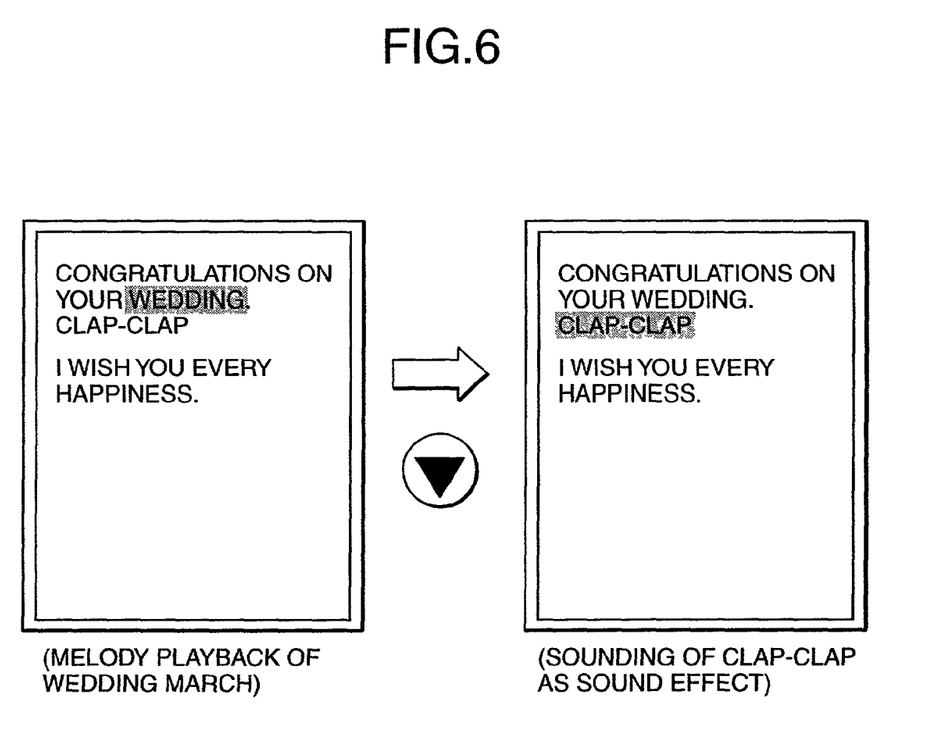
FIG. 6 is a view showing another display operation sample according to the first embodiment of the method of the present invention.

FIGS. 4 to 6 show a keyword table and display operation samples in the first embodiment of the method of the present invention. In the keyword table in FIG. 4, a registration keyword T1, a function T2 corresponding to the keyword, and operation T3 corresponding to the function T2 are stored. Although the keyword table may be stored in the ROM 2 or RAM 3, the user is not allowed to edit the keyword table in the ROM 2. In contrast to this, the user can select and set the keyword T1, function T2, and operation T3 in the keyword table in the RAM 3.

In the keyword search method, when character codes are compared and a perfect match is detected, a successful search is determined. Conceivable search timings are the timing when a screen is displayed and the timing when data is received and stored in the RAM 3.

When characters are displayed on the display section 5, the CPU 1 looks up the keyword table in the ROM 2 or RAM 3. If there is a character that matches the registered keyword T1, the CPU 1 informs the user of a keyword match by inverting the corresponding character. When the user selects the inverted character with the operating section 10, the CPU 1 performs control to execute the operation T3 by the function T2 corresponding to the keyword T1.

If, for example, the character data shown in FIG. 5 is displayed, since the keyword matches "thunder", set operation is performed by using the backlight function. In executing the function, the CPU 1 detects a match between the keyword with input text, and makes the backlight 6 blink. In this case, blinking is executed according to blinking pattern 1. Assume that the user can select and register the operation T3 from a plurality of items.

Assume that a plurality of keywords registered in the keyword table in FIG. 4 are displayed on the display screen as shown in FIG. 6. In this case, if the keyword "marriage" is selected first, melody playback is designated as a function and is called as "Wedding March" operation of audio data stored in the ROM 2, and the CPU 1 analyzes the audio data to cause the acoustic output section 4 to play "Wedding March" as a sound. If the user selects "clap-clap" by operating the operating section 10, a sound effect function is designated. As a consequence, the imitation sound "clap-clap" stored in the ROM 2 is selected and sounded by the acoustic output section 4.

Likewise, when the keyword "light" is present in the displayed character string and selected, the operation of causing the display light (LED) 7 to blink is executed. If the keyword "vibration" is present and selected, the operation of vibrating the vibration motor 8 is executed.

Figure 7:
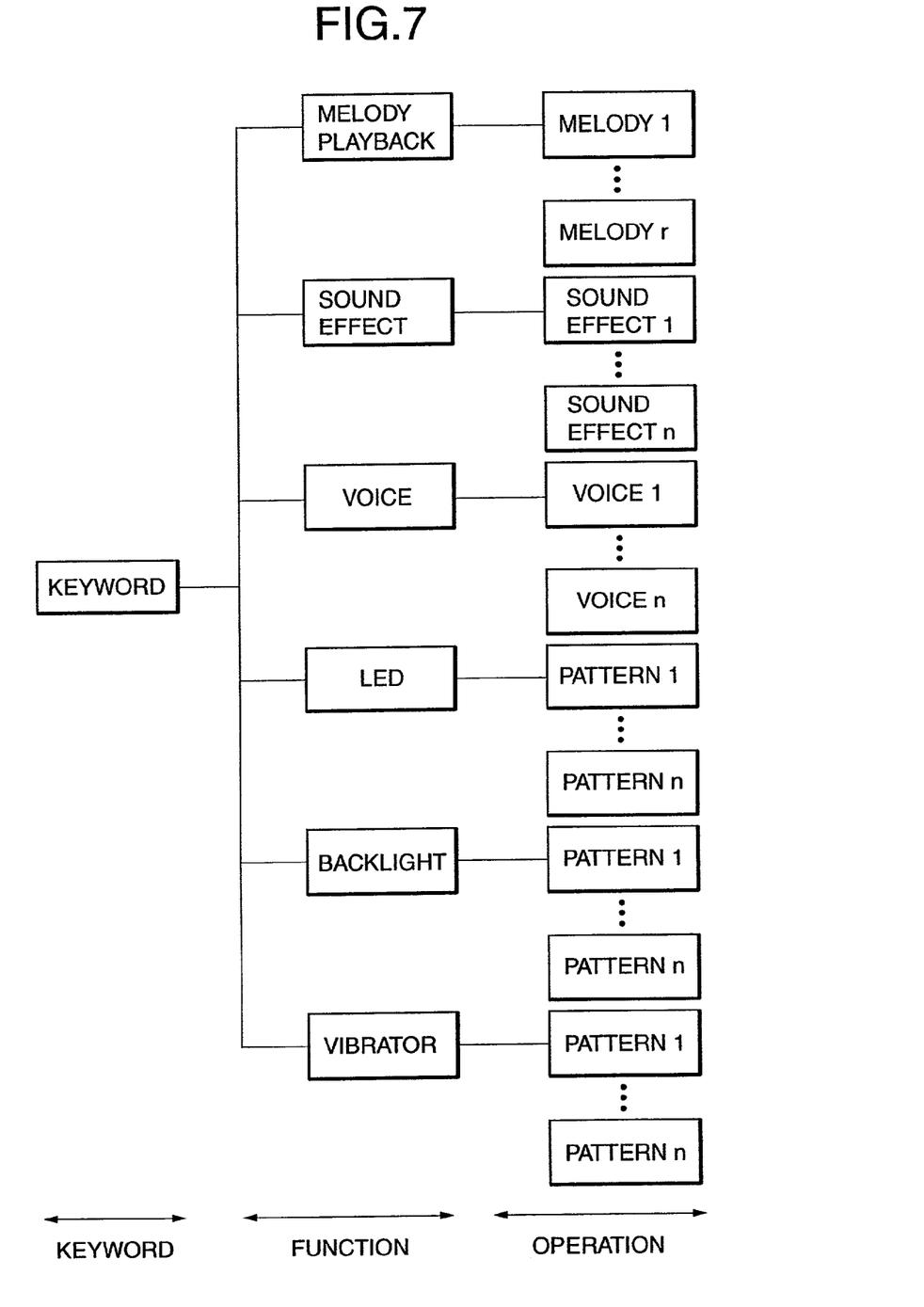
FIG. 7 is a flow of keyword registration according to the present invention.

FIG. 7 shows the flow of registration of keywords in the keyword table. If, for example, the keyword table shown in FIG. 4 is to be formed in the RAM 3, a keyword, function, and operation are sequentially selected. More specifically, the user registers a keyword first, and then selects a function from "melody playback", "sound effect", "voice", "LED", "backlight", "vibrator". After a function is selected, one of operations set for the function is selected.

If, for example, "melody playback" is selected as a function, one of the melodies stored in the storage section 11 built in the terminal apparatus is selected. Likewise, if "LED" or "backlight" is selected, one of a plurality of light emission patterns is selected. If "vibrator" is selected, one of a plurality of vibration patterns can be selected.

By registering a plurality of functions with respect to a single keyword, the respective functions can be simultaneously executed. If, for example, "backlight"+"blinking pattern 1" and "vibrator"+"vibration pattern 2" are set for the keyword "thunder", the backlight 6 and vibration motor 8 can be simultaneously made to blink and vibrate.

In this embodiment, "sound", "LED", "backlight", "vibrator", and the like are used as functions. However, the present invention is not limited to this embodiment, and can be applied to any functions as long as the terminal apparatus can perform corresponding output operation. For example, "infrared light", "radio", and the like can be used as functions and operations.

As described above, according to the present invention, the user of the terminal apparatus registers keywords and functions/operations corresponding to the keywords in a keyword table. Therefore, when a registered keyword is present in displayed text, the corresponding function of the terminal apparatus can be automatically called.

Figure 8:
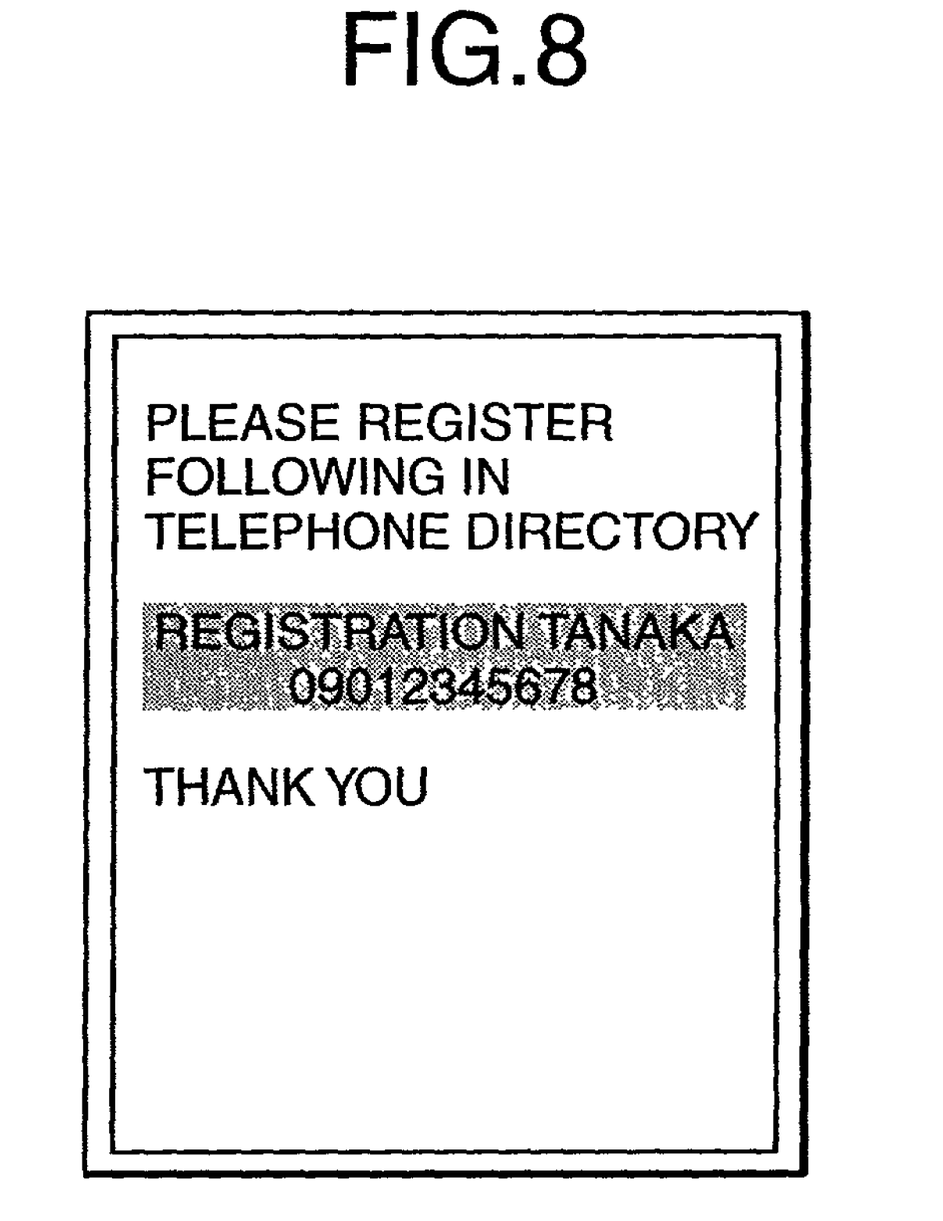
FIG. 8 is a view showing a display operation sample according to the second embodiment of the method of the present invention.
Figure 9:
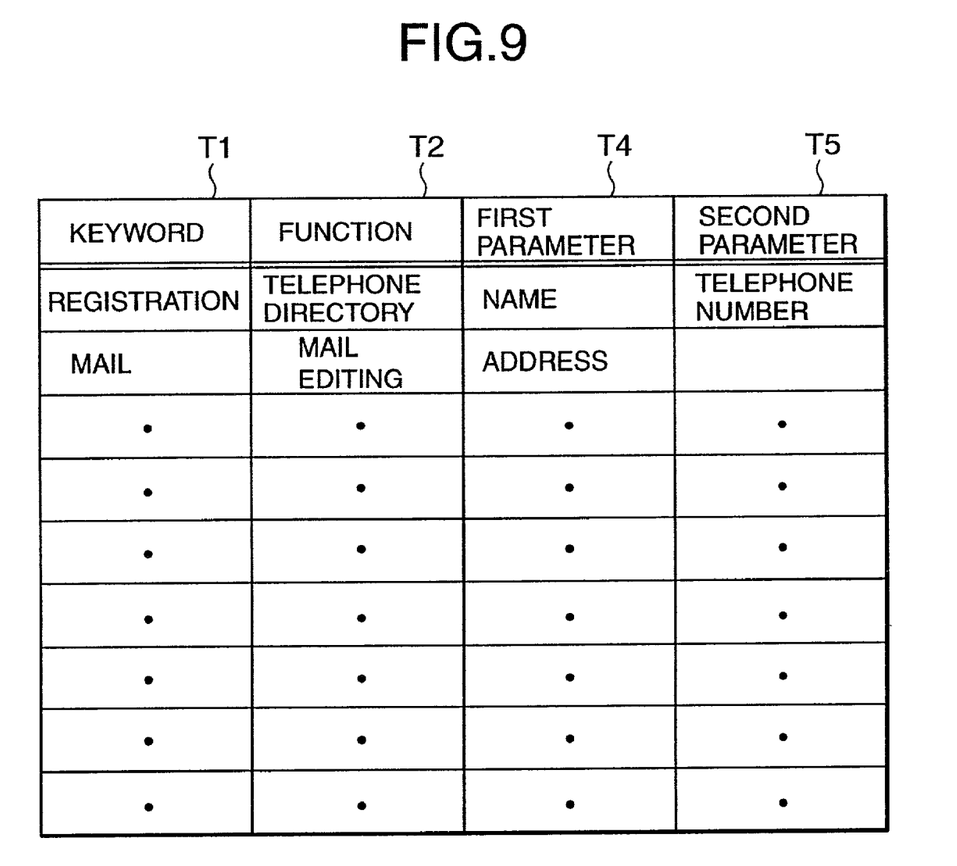
FIG. 9 is a view showing a keyword table to explain the second embodiment of the method of the present invention.

FIGS. 8 and 9 respectively show a display operation sample according to the second embodiment of the method of the present invention. A characteristic feature of this embodiment is that words following a keyword are recognized as parameters. Assume that the keyword table in FIG. 9 is used for the text shown in FIG. 8. If the keyword "registration" exists in the text, words following "registration" are extracted as parameters. In this case, in the keyword table in FIG. 9, "telephone directory registration" is designated as a function of "registration".

Referring to FIG. 8, if the user selects the keyword "registration", "Tanaka" and "09012345678" following "registration" are extracted as first and second parameters and automatically registered in the telephone directory stored in the RAM 3. As a method of extracting parameters, for example, a delimiting method of inserting spaces after "registration" and the name, respectively, or a delimiting method using double quotation marks """" or single quotation marks """ is available.

If no parameters can be extracted, the corresponding function is not executed. In the case of the text "registered in the telephone directory", for example, since no parameter can be extracted, the function designated in the keyword table is not executed. Likewise, if "mail" is registered as a keyword and "mail editing" is designated as a function, an address or the like following "mail" in text is extracted as a parameter, and "mail editing" can be executed. As described above, the user can define and set the functions of the apparatus by registering keywords.

Figure 10:
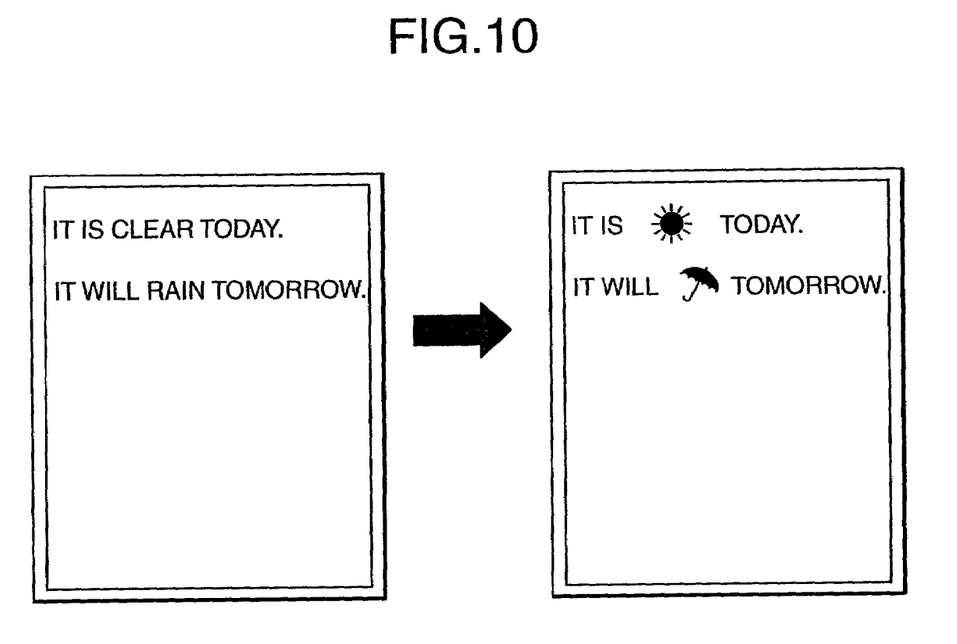
FIG. 10 is a view showing a display operation sample according to the third embodiment of the method of the present invention.
Figure 11:
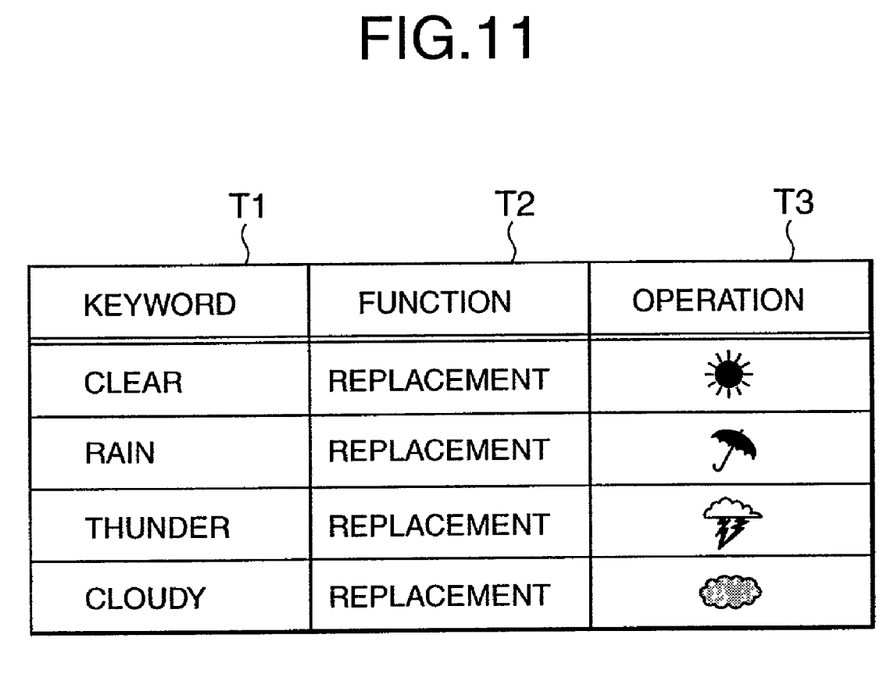
FIG. 11 is a view showing a keyword table to explain the second embodiment of the method of the present invention.

FIGS. 10 and 11 respectively show a display operation sample and keyword table according to the third embodiment of the method of the present invention. A characteristic feature of this embodiment is that a character registered as a keyword is replaced with another character string. Assume that "clear" is registered in the keyword table, and replacement of the keyword with a sun icon is designated as a function. In this case, if the displayed text is "It is clear today" as in FIG. 11, "It is (sun icon) today" can be displayed when the user selects "clear" with a ten-key pad operating section 10.

According to this embodiment, the user of a portable communication terminal apparatus or cellular phone having a small display area can express more contents with a smaller number of characters. In addition, "sun icon" can be restored to the initial word "clear" by selecting the icon again with the ten-key pad operating section 10. If, therefore, text encrypted by character replacement is sent, the receiving side can display the decrypted text by additionally receiving a keyword table.

According to still another embodiment of the present invention, a keyword table and text are acquired in a pair, and the acquired keyword table is stored in a storage section 11. This makes it possible to control the functions of a portable communication terminal apparatus in accordance with the text displayed on the display section. If, for example, a set of an electronically distributed novel and keyword table is acquired, sound effects and backlight can be effectively used in accordance with texts.

What is claimed is:

1. A portable communication terminal apparatus comprising a CPU for controlling a function provided for said portable communication terminal apparatus, a storage section including a ROM used as an area in which a program for operating said CPU is stored and a RAM used as an area for temporarily storing data during operation of said CPU and retaining data registered by a user, a display section used to display a character and graphic pattern under the control of said CPU, a ten-key pad operating section for allowing the user to perform key input operation, and a button control section used to transfer data key-input by the user to said CPU, wherein a keyword table in which the function associated with a predetermined word and an operation of executing the function are registered is stored in the RAM of said storage section, and said CPU comprises means for looking up the keyword table, means for extracting the keyword from character data displayed on said display section and displaying the keyword in a recognizable form, and means for calling the function associated with the extracted keyword and controlling execution of the function when a function execution instruction is received from said button control section;

wherein said CPU comprises a function of replacing the extracted keyword with another character or an illustration and displaying the character or illustration upon reception of a function execution instruction from said button control section; and a function of replacing the character or illustration with the original keyword and display the keyword upon reception of a function execution instruction from said button control section.

2. A portable communication terminal apparatus comprising a CPU for controlling a function provided for said portable communication terminal apparatus, a storage section including a ROM used as an area in which a program for operating said CPU is stored and a RAM used as an area for temporarily storing data during operation of said CPU and retaining data registered by a user, a display section used to display a character and graphic pattern under the control of said CPU, a ten-key Dad operating section for allowing the user to perform key input operation, and a button control section used to transfer data key-input by the user to said CPU, wherein a keyword table in which the function associated with a predetermined word and an operation of executing the function are registered is stored in the RAM of said storage section, said CPU comprises means for looking up the keyword table, means for extracting the keyword from received character data displayed on said display section and displaying the keyword in a recognizable form, and means for calling the function associated with the extracted keyword and controlling execution of the function when a function execution instruction is received from said button control section;

wherein the keyword table stored in the RAM is configured such that a registered content can be chanced or a content can be added;

wherein said CPU comprises a function of replacing the extracted keyword with another character or an illustration and displaying the character or illustration upon reception of a function execution instruction from said button control section; and wherein said CPU comprises a function of replacing the character or illustration with the original keyword and display the keyword upon reception of a function execution instruction from said button control section.

3. An apparatus according to claim 2, further comprising means for inverting the extracted keyword as means for displaying a keyword in a recognizable form.

4. An apparatus according to claim 2, further comprising means for inverting the extracted keyword as means for displaying a keyword in a recognizable form.

5. An apparatus according to claim 2, wherein said portable communication terminal apparatus comprises an output section used to output an audio signal, a backlight used to illuminate said display section, a display light ON/OFF-controlled by said CPU, and a vibration motor which is ON/OFF-controlled by said CPU to generate vibrations to be felt by a user, and said CPU comprises means for controlling one operation selected from melody playback, sound-effect operation, voice outputting operation by said sound output section, blinking of said display light, blinking of said backlight, control of said vibration motor or a combination thereof.

6. An apparatus according to claim 2, wherein said CPU comprises a function of registering displayed character data following the extracted keyword in a built-in memory upon reception of a function execution instruction from said button control section.

7. An apparatus according to claim 2, wherein said CPU comprises a function of replacing the extracted keyword with another character or an illustration and displaying the character or illustration upon reception of a function execution instruction from said button control section.

8. An apparatus according to claim 2, further comprising means for receiving the keyword table stored in said storage section, and means for storing the keyword in said storage section.

* * * * *